United States Patent
Morikawa et al.

(10) Patent No.: US 7,353,263 B2
(45) Date of Patent: Apr. 1, 2008

(54) COMMUNICATION SETTING MANAGEMENT SYSTEM

(75) Inventors: Ikuya Morikawa, Kawasaki (JP);
Makoto Minoura, Kawasaki (JP);
Kenichi Fukuda, Kawasaki (JP);
Elisabeth Giessler, Sankt Augustin (DE); Olaf Karsten Henninger, Sankt Augustin (DE); Rainer Prinoth, Sankt Augustin (DE); Thomas Schroeder, Sankt Augustin (DE)

(73) Assignees: Fujitsu Limited, Kawasaki (JP); GMD-Forschungszentrum Informationstecknik GmbH, Sankt Augustin (DE)

( * ) Notice: Subject to any disclaimer, the term of this patent is extended or adjusted under 35 U.S.C. 154(b) by 560 days.

(21) Appl. No.: 09/853,782

(22) Filed: May 14, 2001

(65) Prior Publication Data

US 2001/0054096 A1    Dec. 20, 2001

(30) Foreign Application Priority Data

May 17, 2000    (JP) .............................. 2000-145646

(51) Int. Cl.
  *G06F 15/173*    (2006.01)
  *G06F 15/177*    (2006.01)
  *G06F 15/16*    (2006.01)

(52) U.S. Cl. ...................... 709/223; 709/220; 709/201; 709/229

(58) Field of Classification Search ................ 709/222, 709/223, 224, 220, 221, 229, 201
See application file for complete search history.

(56) References Cited

U.S. PATENT DOCUMENTS 5,838,918 A * 11/1998 Prager et al. ............... 709/221

6,167,445 A * 12/2000 Gai et al. .................... 709/223
6,243,747 B1 * 6/2001 Lewis et al. ................ 709/220

(Continued)

FOREIGN PATENT DOCUMENTS

EP    0 944 278 A2    9/1999

(Continued)

OTHER PUBLICATIONS

Hein, Von Mathias, "Die Zukunft Gehort Regelbasierten Netzen", Funkschau, Franzis-Verlag K.G. Munchen, Germany, vol. 71, No. 22, Oct. 16, 1998, pp. 74-77.

(Continued)

*Primary Examiner*—Thu Ha Nguyen
*Assistant Examiner*—Kevin Bates
(74) *Attorney, Agent, or Firm*—Staas & Halsey LLP

(57) ABSTRACT

Disclosed is a communication setting management system comprising setting template entry/edit means for entering or editing a setting template that collects contents to be set for the communication entities, with reference to information on a concrete method of setting the communication entities; setting template accumulation means for storing the setting template entered or edited by the setting template entry/edit means; application rule entry/edit means for entering or editing application rules prescribing rules of which setting plate is to be applied to a communication having what kind of attribute; application rule storing means for storing the application rule input or edited by the application rule entry/edit means; and retrieval and response function means for selecting a corresponding application rule from the application rule storing means in accordance with the attribute of a destination communication entity to distribute the setting, reading from the setting template storing means a setting template having a setting template name specified by the application rule, and distributing the read setting template to the communication entity.

5 Claims, 24 Drawing Sheets

U.S. PATENT DOCUMENTS

| | | | |
|---|---|---|---|
| 6,327,618 B1* | 12/2001 | Ahlstrom et al. | 709/223 |
| 6,381,639 B1* | 4/2002 | Thebaut et al. | 709/222 |
| 6,418,468 B1* | 7/2002 | Ahlstrom et al. | 709/223 |
| 6,718,379 B1* | 4/2004 | Krishna et al. | 709/223 |
| 6,738,908 B1* | 5/2004 | Bonn et al. | 713/201 |
| 7,143,151 B1* | 11/2006 | Kayashima et al. | 709/223 |

FOREIGN PATENT DOCUMENTS

| | | |
|---|---|---|
| WO | 98/28880 | 7/1998 |

OTHER PUBLICATIONS

Hinrichs, Susan, "Policy-Based Management: Bridging the Gap", Computer Security Applications Conference 1999, Pheonix, AZ, Dec. 1999, pp. 209-218.

Marriott, Damian, et al., "Management Policy Service for Distributed Systems", Services in Distributed and Networked Environments, 1996. Proceedings of Third International Workshop on Macau, Jun. 3-4, 1996, Los Alamitos, CA, IEEE Computer Society, Jun. 3, 1996, pp. 2-9.

Braun, T., et al."Virtual Private Network Architecture", CATI: Charging and Accounting Technology for the Internet, Jan. 8, 1999, pp. 1-30.

Blight, David C., et al., "Policy-Based Networking Architecture for QoS Interworking in IP Management-Scalable Architecture for Large-Scale Enterprise-Public Interoperation", Proceedings of the Sixth IFIP/IEEE International Symposium on Integrated Network Management, Boston, MA, May 24, 1999, pp. 813-826.

\* cited by examiner

FIG. 10

| Setting method information 20 | | |
|---|---|---|
| Authentication 200 | Concealment 201 | Log record 202 |
| None | None | None |
| RSA 512 bit | DES | Presence |
| RSA 1024 bit | Triple DES | |
| RSA 2048 bit | | |

FIG. 11

| Setting template name 210 | Comments 212 | Concrete setting contents 211 | | |
|---|---|---|---|---|
| | | Authentication 200 | Concealment 201 | Log record 202 |
| T00 | No security | None | None | Absence |
| T01 | For personnel, log absence | RSA 512 bit | DES | Absence |
| T02 | For personnel, log presence | RSA 512 bit | DES | Presence |
| T03 | For communication with dealer | RSA 1024 bit | Triple DES | Presence |

FIG. 12

| No. | Subject 220 | Action 221 | Object 222 | Setting template name 210 |
|---|---|---|---|---|
| 1 | Admin | read | Personnel information server | T01 |
| 2 | Admin | write | Personnel information server | T02 |
| 3 | Customer | read | Public server | T00 |
| 4 | Customer | read | Customer information server | T03 |
| 5 | User | read | General server | T00 |
| 6 | User | read | Personnel information server | T02 |

FIG. 13

| Setting template name 210 | Comments 212 | Concrete setting contents 211 | | |
|---|---|---|---|---|
| | | Authentication 200 | Concealment 201 | Log record 202 |
| T00 | No security | None | None | Absence |
| T01 | For personnel information | RSA 512 bit | DES | Absence |
| T02 | For personnel information | RSA 512 bit | DES | Presence |
| T03 | For communication with dealer | RSA 1024 bit | Triple DES | Presence |
| T04 | For interacting drawings with related companies | | | |

Display alternatives:
None
RSA 512 bit
RSA 1024 bit
RSA 2048 bit

FIG. 14

| No. | Subject 220 | Action 221 | Object 222 | Setting template name 210 |
|---|---|---|---|---|
| 1 | Admin | read | Personnel information server | T01 |
| 2 | Admin | write | Personnel information server | T02 |
| 3 | Customer | read | Public server | T00 |
| 4 | Customer | read | Customer information server | T03 |
| 5 | User | read | General server | T00 |
| 6 | User | read | Personnel information server | T02 |
| 7 | Ex_staff | read | Design drawing server | |

Display alternatives

T00: No security
T01: For personnel, log absence
T02: For personnel, log presence
T03: For communication with dealer
T04: For interacting drawings related companies

FIG. 16A

| Setting template name 210 | Comments 212 | Concrete setting contents 211 | | |
|---|---|---|---|---|
| | | Authentication 200 | Concealment 201 | Log record 202 |
| T11 | For personnel, log absence (RC4) | RSA 512 bit | RC4 | Absence |
| T12 | For personnel, log absence (RC4) | RSA 512 bit | RC4 | Presence |
| T13 | For communication with dealer(RC4) | RSA 1024 bit | RC4 | Presence |

FIG. 16B

| Concrete setting contents 211 | | |
|---|---|---|
| Authentication | Concealment | Log record |
| None | None | Absence |
| RSA 512 bit | DES | Presence |
| RSA 1024 bit | Triple DES | |
| RSA 2048 bit | RC4 | |

FIG. 18

| Setting template name 210 | Comments 212 | Concrete setting contents | | |
|---|---|---|---|---|
| | | Authentication | Concealment | Log record |
| T21 | No security | None | None | Absence |
| T22 | Only log record | None | None | Presence |
| T23 | Weak encrypt | RSA 512 bit | DES | Absence |
| T24 | Strong encrypt | RSA 512 bit | Triple DES | Absence |

FIG. 19A  Application rule of system A

| No. | Subject 220 | Action 221 | Object 222 | Setting template name 210 |
|---|---|---|---|---|
| 1 | User | read | General server | T21 |
| 2 | User | read | Personnel information server | T23 |

FIG. 19B  Application rule of system B

| No. | Subject 220 | Action 221 | Object 222 | Setting template name 220 |
|---|---|---|---|---|
| 1 | User | read | General server | T22 |
| 2 | Section A | read | Personnel information server | T24 |

FIG. 22A

Equivalent information $$\boxed{T21 = T22}$$

FIG. 22B

Preferential information $$\boxed{T23 < T24}$$

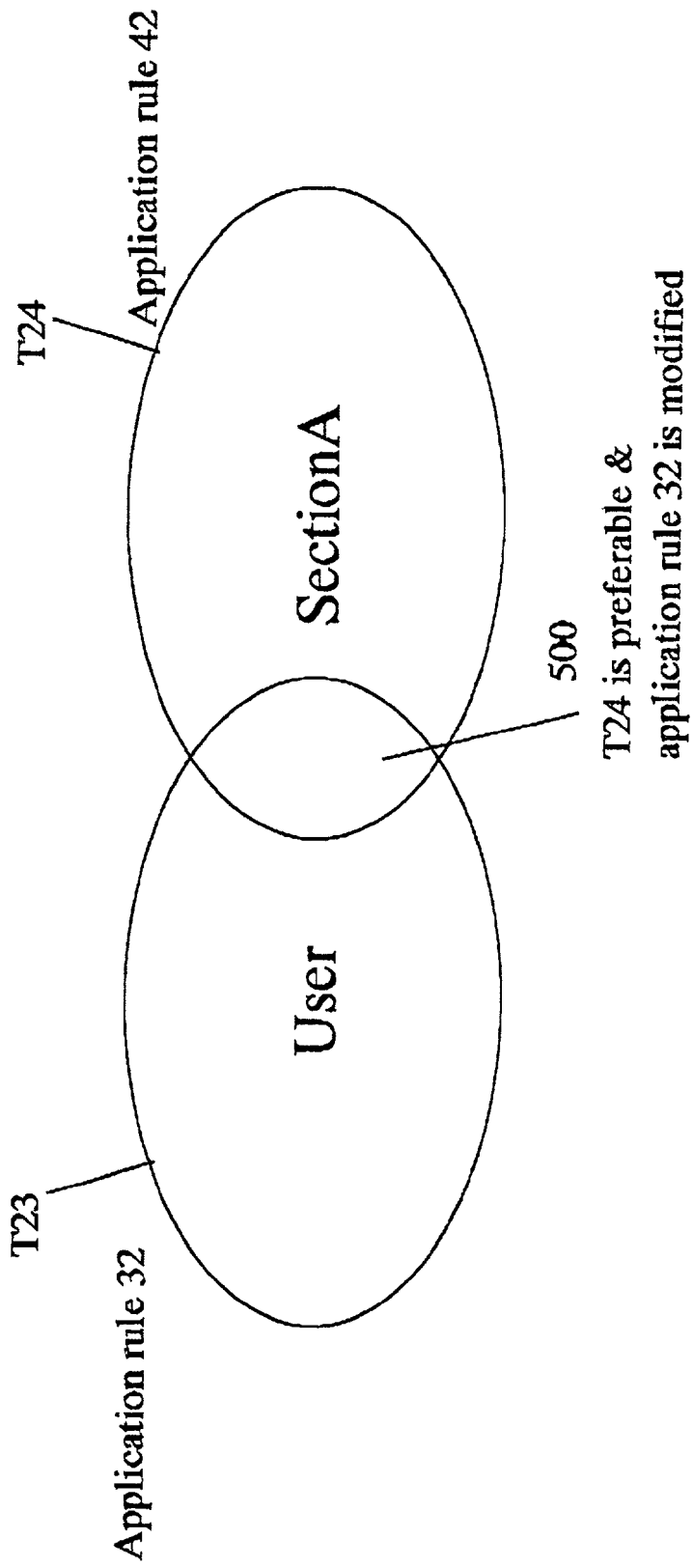

FIG. 24A  Application rule of system A

| No. | Subject | Action | Object | Setting template name |
|---|---|---|---|---|
| 1 | User | read | General server | T21 |
| 2 | Section A | read | Personnel information server | T24 |
| 3 | User | read | Personnel information server | T23 |

FIG. 24B  Application rule of system B

| No. | Subject | Action | Object | Setting template name |
|---|---|---|---|---|
| 1 | User | read | General server | T22 |
| 2 | Section A | read | Personnel information server | T24 |
| 3 | User | read | Personnel information server | T23 |

COMMUNICATION SETTING MANAGEMENT SYSTEM

BACKGROUND OF THE INVENTION

1. Field of the Invention

The present invention relates to a communication setting management system for collectively managing communication settings that prescribe what kind of characteristics are to be imparted to what kind of communications when communications are made between communication entities.

2. Description of the Related Art

With the progress of networks in late years, communication substance or communication entities such as computers and communication apparatuses, and software parts to be realized with object oriented and the like are connected to networks through wire or wireless, thereby making various communications in interconnection.

Here, the communication substance, i.e. the communication entity indicates a computer having a communication function, a communication hardware apparatus such as a router or the like, and a software part to be realized with object oriented, etc. Furthermore, communication characteristics indicate a speed or sequence of communication, a degree or quality of security, and the like. A communication setting indicates a process sequence for denoting a speed or quality of communication, an encryption algorithm, and parameters such as a length of encryption key or the like.

In the communication between the communication entities connected to the aforesaid network, it is desirable that characteristics of communication are managed, and networks are effectively exploited, and appropriate security is adapted.

As one proposal therefor, in the security management system mentioned in, e.g., Japanese Patent Application Laid-Open Publication No. 6-6347, there is disclosed a system for distributing a setting in security to a plurality of communication apparatus.

In such a case, the characteristics of communication are allocated according to communication attributes. That is, it is generic that a communication setting is allocated. Here, as the communication attributes, a communication originator (a user name, a host name, a port number, etc.), a recipient (a user name, a host name, a port number, a service name, a file name, etc.), communication variety (request contents, an argument, etc.), and the like are listed.

Rules as to what kind of communication setting is allocated to such the communication attributes, respectively, are called an application rule, and such the communication setting and application rule are together called a policy.

As a construction of managing such the communication setting, in a first prior art as shown in FIG. 1, a notion like a setting level has been used. In FIG. 1, a communication setting management apparatus 1 for setting communication is shown with respect to a plurality of communication entities $2_1$ to $2_n$ to be connected to a network.

Here, the communication setting management apparatus (CSMA) 1 has an application rule entry/edit means 100, an application rule storing means 101, and a retrieval and response function unit 102. These means and function unit are constituted as a hardware, or realized by a software.

A setting level 200 is prepared for such the communication setting management apparatus 1. This setting level 200 denotes different setting contents with a rough level, and the setting level per se does not denote concrete setting contents. The setting level and a collation information 201 of the concrete setting contents are separately prepared, instead. Collating with this collation information 201 and the given setting level 200, it is decided what kind of setting is specifically conducted for the communication entities $2_1$ to $2_n$.

An administrator collates only the setting level 200 with each other, or collates the setting level 200 with an collation information 201, and describes the application rules that the setting level is allocated to each communication by use of the application rule entry/edit means 100. The described application rule is stored in an application rule storing means (ARSM) 101.

The application rule is retrieved from the application rule storing means 101 by the retrieval and response function unit (R&RFU) 102 from time to time, thereby setting in the corresponding communication entities $2_1$ to $2_n$. In this case, the application rule and setting level are handled in distinction from each other. In other words, the policy is explicitly divided into the application rule and setting level.

As a second prior art, without preparing the setting level 200 like the method of FIG. 1, as shown in FIG. 2 the administrator can also specifically describe setting contents to be allocated when it describes the application rule, by use of a detailed setting entry/edit means 103. In this case, it is essential that the administrator has detailed knowledge in concrete setting contents (202), and the application rules and settings are not distinguished from each other, and are handled as impartibility to be stored in an application rule and setting storing means (AR&SSM) 104. In other words, the policy is mixed together with the application rule and setting.

Furthermore, as a placing method of the communication setting management apparatus 1, as shown in FIG. 3, relating to a single purpose and use conventionally, the single communication setting management apparatus 1 has collectively set and managed the plurality of communication entities. In FIG. 3, in the setting relating to the communication also, a sole communication setting management apparatus has imparted a setting to the communication entities $2_1$ and $2_2$ across the communication.

In the aforesaid prior art, in the case where the collation information 201 is concealed from the administrator, it is unnecessary for the administrator to have high-grade knowledge in the detailed setting contents. It is possible to readily input and edit, but inversely when it has the high-degree knowledge, it is impossible to input and edit by stepping into the detailed setting contents.

On the other hand, in the case where the collation information is provided to the administrator in the first prior art, and in the case of the aforesaid second prior art, it is possible for the administrator to finely set by use of the high-grade knowledge, but the administrator not having the high-grade knowledge is difficult to set.

That is, it is impossible to satisfy simultaneously a request of the administrator who has the high-grade knowledge and is desired to describe the finest policy and a request of the administrator who does not have the high-grade knowledge and readily desires to describe the policy, and there is a problem that it is impossible to take partial charge of management between the administrators having different knowledge.

SUMMARY OF THE INVENTION

It is therefore an object of the present invention to provide a communication setting management system capable of simultaneously realizing a description of the finest communication setting requiring high-grade knowledge and a description of an easy application rule not requiring the high-grade knowledge in the case where communication settings are distributed to many communication entities.

Furthermore, it is another object of the present invention to provide a communication setting management system capable of making efficient management when a different setting can be realized in each management domain by placing in each domain.

According to a first aspect of the present invention, in order to solve the aforesaid problems, there is provided a communication setting management system designed to distribute a communication characteristics setting to a plurality of communication entities, comprising setting template entry/edit means for entering or editing a setting template that collects contents to be set for the communication entities, with reference to information on a concrete method of setting the communication entities; setting template accumulation means for accumulating the setting template entered or edited by the setting template entry/edit means; application rule entry/edit means for entering or editing application rules prescribing rules of which setting template is to be applied to a communication having what kind of attribute; application rule accumulation means for accumulating the application rule input or edited by the application rule entry/edit means; and retrieval and response function means for selecting a corresponding application rule from the application rule accumulation means in accordance with the attribute of a destination communication entity to distribute the setting, reading from the setting template accumulation means a setting template having a setting template name specified by the application rule, and distributing the read setting template to the communication entity.

Preferably, the communication setting management system of the present invention further comprises setting template collective entering means for collectively entering a group of previously defined setting templates into the setting template accumulation means.

According to a second aspect of the present invention, there is provided a the communication setting management system arranged to include a plurality of management domains each having at least one communication entity, the domains existing via a network, the system comprising a communication setting management apparatus disposed in each of the plurality of management domains, the communication setting management apparatus disposed in a corresponding management domain imparting, on a management domain basis, a different communication characteristics setting to communications between communication entities belonging to different management domains, the setting being managed on a corresponding management domain basis.

Preferably, the communication setting management system further comprises a contradiction detection function unit for mutually interchanging information with a communication setting management apparatus disposed in the other management domain, and detecting a contradiction between the information and the setting template and the application rule of its own management domain.

Furthermore, the communication setting management system may further comprise a contradiction modification function unit for modifying a contradiction at the time when a contradiction is detected that a setting template or setting templates specified by the contradiction detection function unit according to the application rule are not coincident with each other.

The features of the present invention will become more apparent from the following detailed description of preferred embodiments when taken in conjunction with the accompanying drawings.

BRIEF DESCRIPTION OF THE DRAWINGS

FIG. 10 is an illustration of setting templates to be stored in a setting template accumulation means according to the first embodiment of the present invention;

FIG. 11 is another illustration of setting templates to be stored in the setting template accumulation means according to the first embodiment of the present invention;

FIG. 12 is an illustration of application rules to be stored in an application rule accumulation means according to the first embodiment of the present invention;

FIG. 13 is an illustration of a screen of entering and editing setting templates displayed to an upper administrator according to the first embodiment of the present invention;

FIG. 14 shows a sample of an application rule entering and editing screen displayed to a general administrator according to the first embodiment of the present invention;

FIGS. 16A and 16B show samples of setting template groups to be annexed collectively according to the first embodiment of the present invention;

FIG. 18 shows a sample of the setting templates shared by the communication setting management apparatus of systems A, B according to the second embodiment of the present invention;

FIGS. 19A and 19B are illustrations showing the application rules of the systems A, B in FIG. 18;

FIGS. 22A and 22B are illustrations for explaining an operation of contradiction modification;

FIG. 23 is a conceptual diagram of the contradiction modification; and

FIGS. 24A and 24B show application rules after the contradiction modification.

DESCRIPTION OF THE PREFERRED EMBODIMENTS

Hereinafter, embodiments of the present invention will be described with reference to the accompanying drawings. Incidentally, the drawings are prepared for illustrative purposes only, and accordingly a scope of protection of the present invention is not restricted by such drawings.

Figure 4:
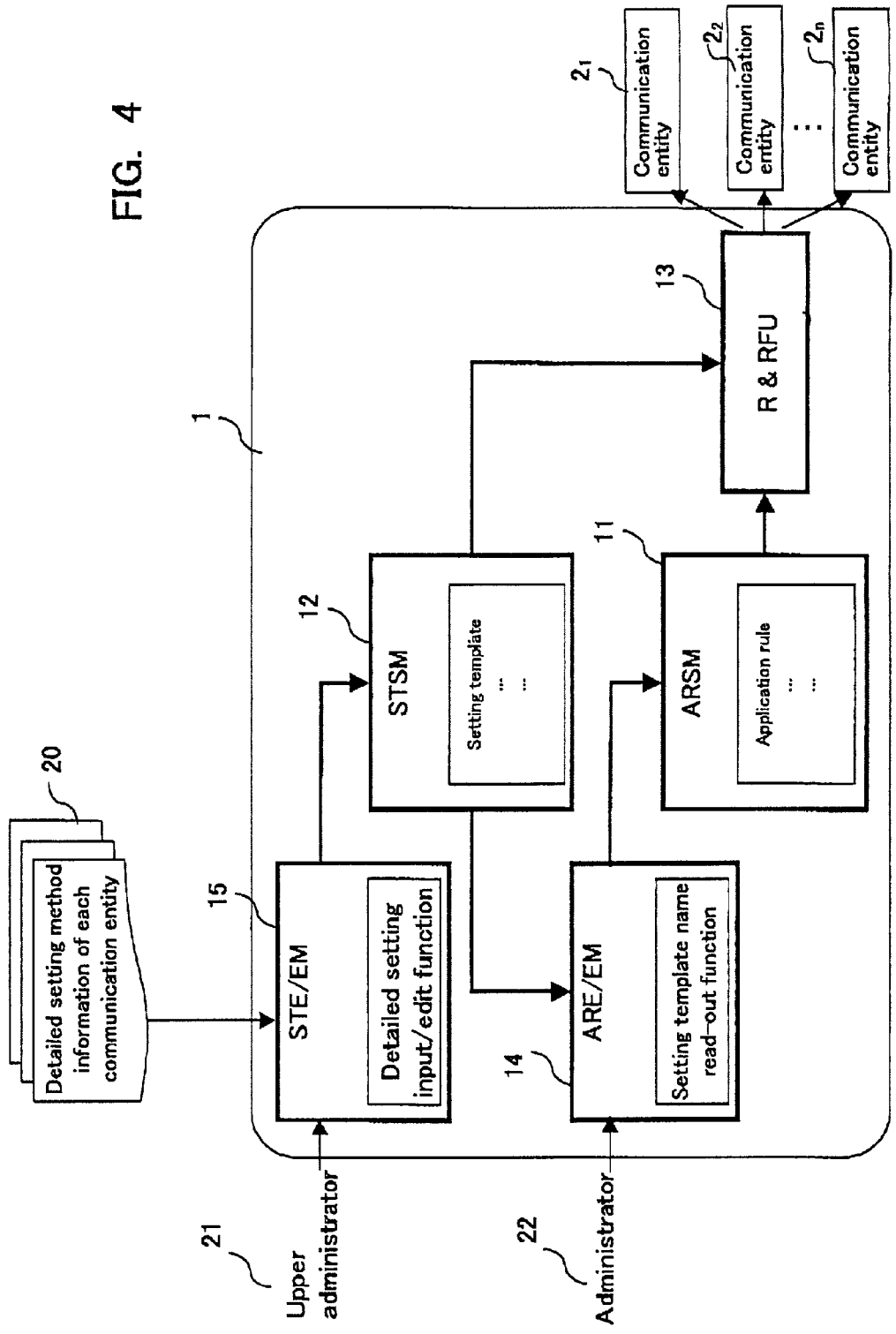
FIG. 4 is a block diagram for explaining a constitution according to a first embodiment of the present invention.

FIG. 4 is a diagram for explaining a notion of a first embodiment of a communication setting management system according to the present invention. In FIG. 4, a communication setting management apparatus 1 is constituted by an application rule storing means (ARSM) 11, a setting template storing means (STSM) 12, a retrieval and response function unit (R&RFU) 13, an application rule entry/edit means (ARE/EM) 14, and a setting template entry/edit means (STE/EM) 15. The functions corresponding to the function unit and means can be realized by a hardware and software, as described above.

Settings to be transferred to communication entities are collected to name setting templates. The setting template entry/edit means 15 has a detailed setting input and edit function. An upper administrator 21 having high-grade knowledge refers to a concrete setting method information 20 of each communication entity, while the setting templates are input or edited by use of the setting template entry/edit means 15, and are stored in the setting template storing means 12.

An application rule describes rules which setting template should apply on a communication having what kind of attribute. That is, the application rule is a combination of communication attributes and setting template names. The application rule is input or edited using the application rule entry/edit means 14 by a standard administrator 22.

The application rule entry/edit means 14 has a setting template name read-out function, and reads out a summary of names of the setting templates from the setting template storing means 12, which is presented to the administrator to select.

Such entered or edited application rules are stored in the application rule storing means 11. When a communication occurs and a setting is distributed to a communication entity 2, the retrieval and response function unit 13 selects a corresponding application rule from the application rule storing means 11 in accordance with communication attributes of a distribution destination, and reads out a setting template having a setting template name specified therein from the setting template accumulation means 12. Then, it distributes this setting template to the communication entity of the distribution destination.

In this embodiment, there are provided the setting template storing means 12 and the setting template entry/edit means 15, and a method of fetching out a combination is used which is desired to exploit from a concrete setting method 20 to input, edit, and store.

Thus, relating to typical setting templates, they are input by the upper administrator 21 having high-grade knowledge. Thus, a standard administrator 22 can readily input the application rule without owning high-grade knowledge relating to the concrete setting method of each communication entity.

Furthermore, the upper administrator 21 owning the high-grade knowledge relating to the concrete setting method examines even detailed values in the setting templates by use of the setting template entry/edit means 15, and inputs and edits, thereby executing the finest setting templates.

As described above, it is possible to fulfill both demands that the setting is readily assigned without requiring the high-grade knowledge in response to the administrator's knowledge and that the finest setting is assigned by use of the high-grade knowledge.

Accordingly, management affairs are shared between the administrators 21 and 22 having different knowledge, so that a policy (setting and application rule) can efficiently be managed.

Here, in a constitution of the embodiment of FIG. 4, the setting template entry/edit means 15 peruses, inputs, and edits the setting templates through interactive input and output with the upper administrator 21, and in the case where many setting templates previously defined are prepared as data, an interactive input requires much labor, and efficiency is worse.

That is, in a constitution of the embodiment shown in FIG. 4, an input of the setting templates is made via the setting template entry/edit means 15, and this object is to interactively input and edit for the administrator 21, and in the case where the setting template groups already defined exist, efficiency is worse.

Figure 5:
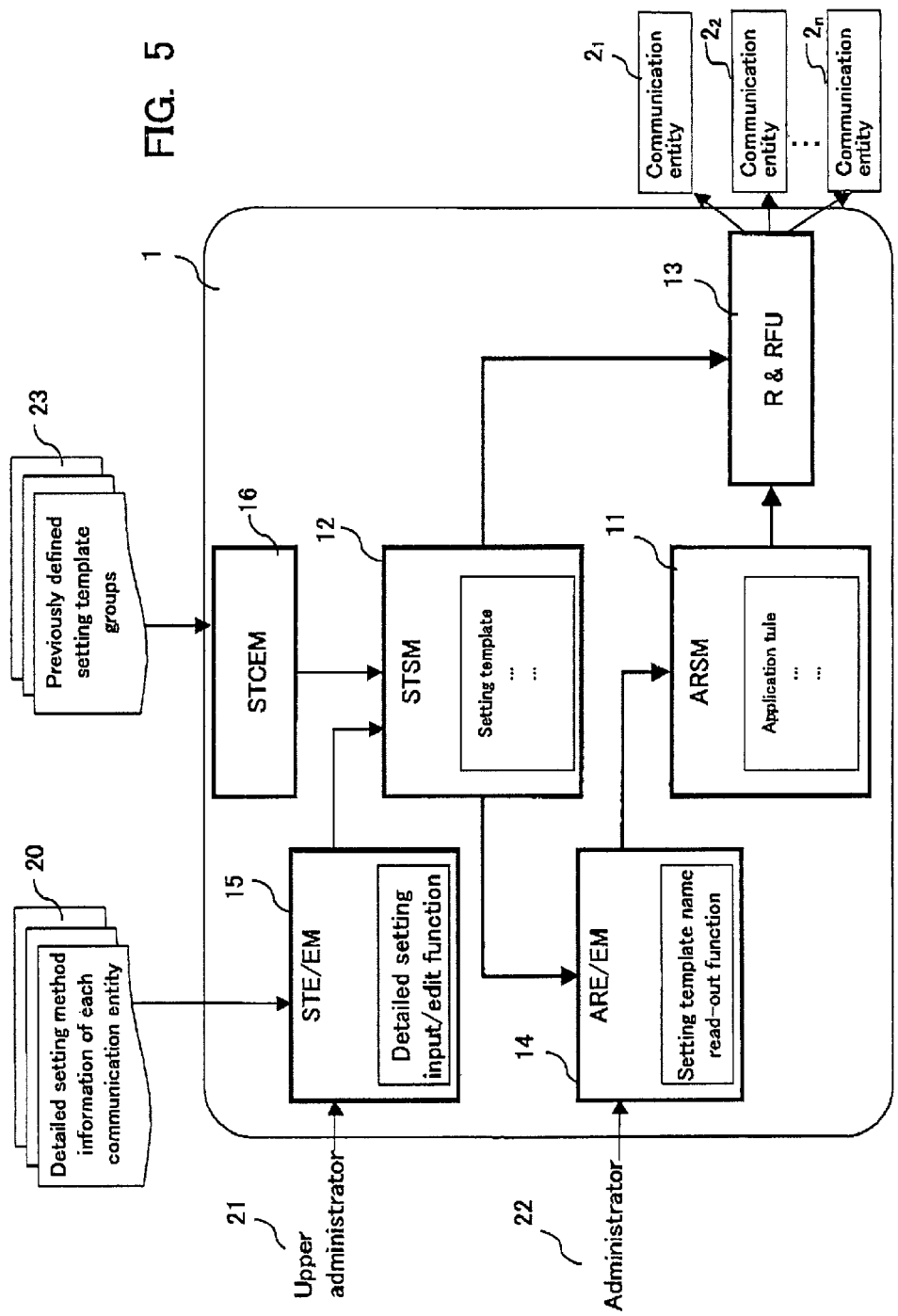
FIG. 5 is a block diagram for explaining a constitution according to a second embodiment of the present invention.

Then, a communication setting management system in which the previously defined setting template groups can collectively be input is demanded. FIG. 5 is a diagram showing a notion structure of an embodiment in response to such demand.

A constitution of the embodiment of FIG. 5 is characterized in that, in the communication setting management apparatus 1 having the constitution of the embodiment of FIG. 4, a setting template collectively entering means (ST-CEM) 16 which prepares and collectively accepts the previously defined setting template groups 23, and stores them in the setting template storing means 12 is annexed thereto.

The previously defined setting template groups 23 can collectively be input into the setting template storing means 12 without assistance of the administrator by the setting template collectively entering means 16 for collectively receiving the previously defined setting template groups 23. Thus, the previously defined setting template groups 23 can efficiently be input, and in particular this is effective when the setting template groups in response to a function newly mounted by a designer of the communication entities are distributed.

Here, there is a policy that settings must be equal across communications concerning policies in the communications, but there also can be a policy that they are not necessarily equal. As for security as an example, in the case of encoding communication contents, a type of encryption algorithm and a length of a key to be used must be set equally, but a policy of communication audit, e.g. a setting whether or not a log is taken need not be equal.

Furthermore, parameters of communication attributes which are desired to describe the application rule are different across the communication. For example, in the case of a communication that a user of a client accesses to a file in a server, it is easy for a domain at a client side to describe the application rule for an attribute as the user. However, as there is less knowledge in the file in an attribute as an objective file, the description is hard to render.

On the other hand, it is easy for the domain at a server side to describe the application rule for the attribute as the file, but as there is less knowledge in the user for the attribute as the user, the description is hard to render. In such case, it is desirable that different application rules between at the server side and client side can be described.

Figure 1:
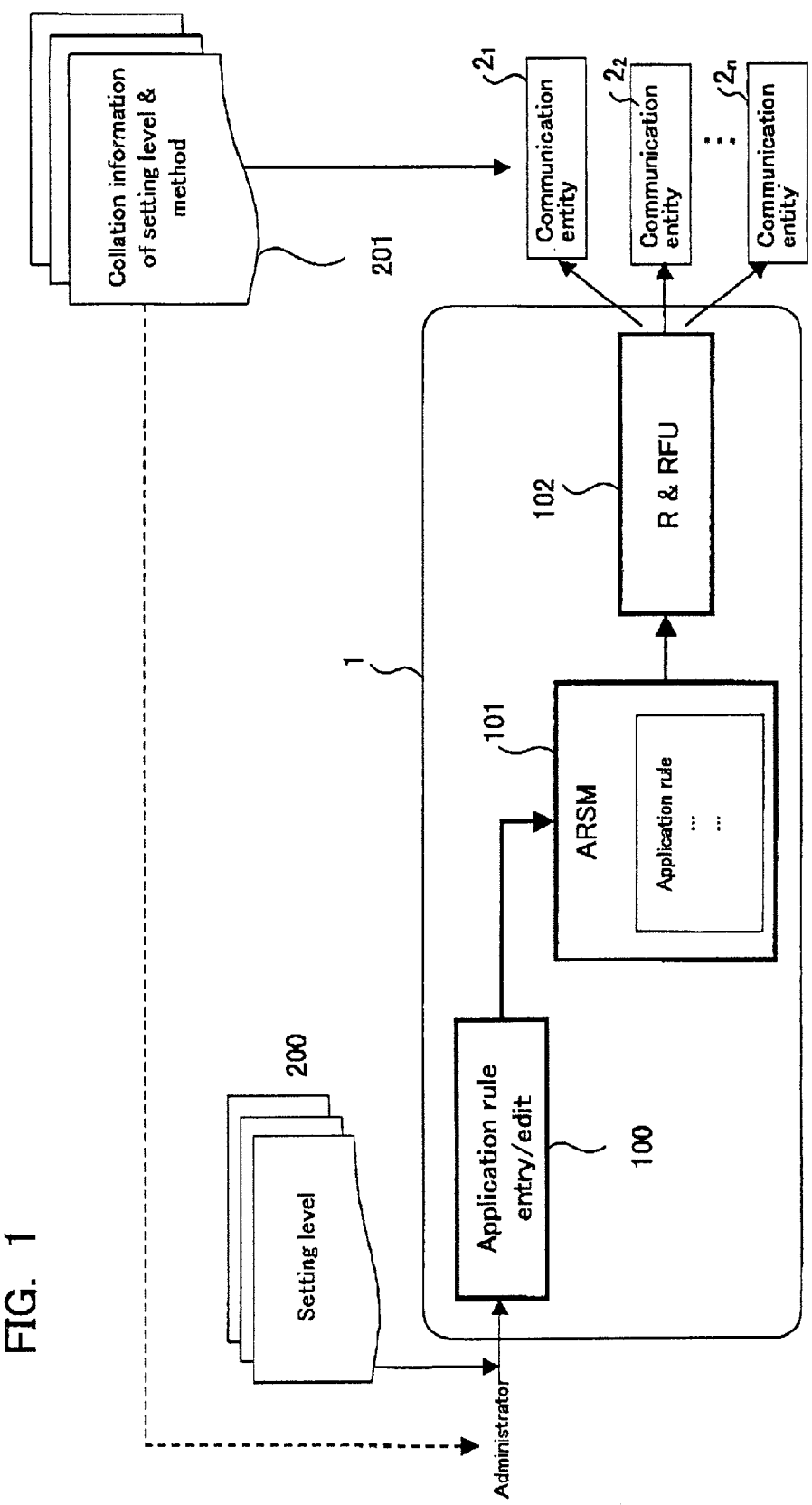
FIG. 1 is a block diagram for explaining a first prior art.
Figure 2:
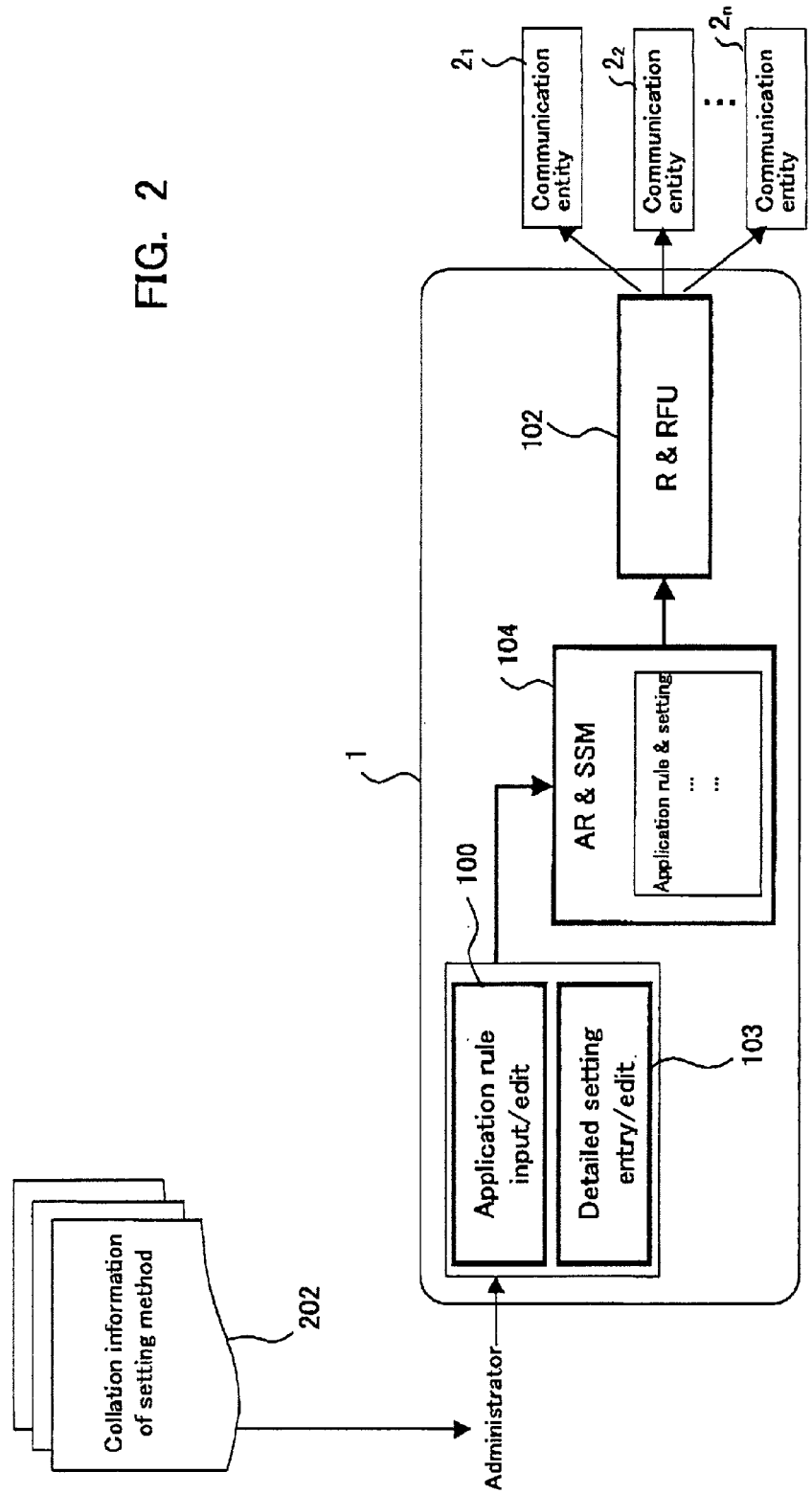
FIG. 2 is a block diagram for explaining a second prior art.
Figure 3:
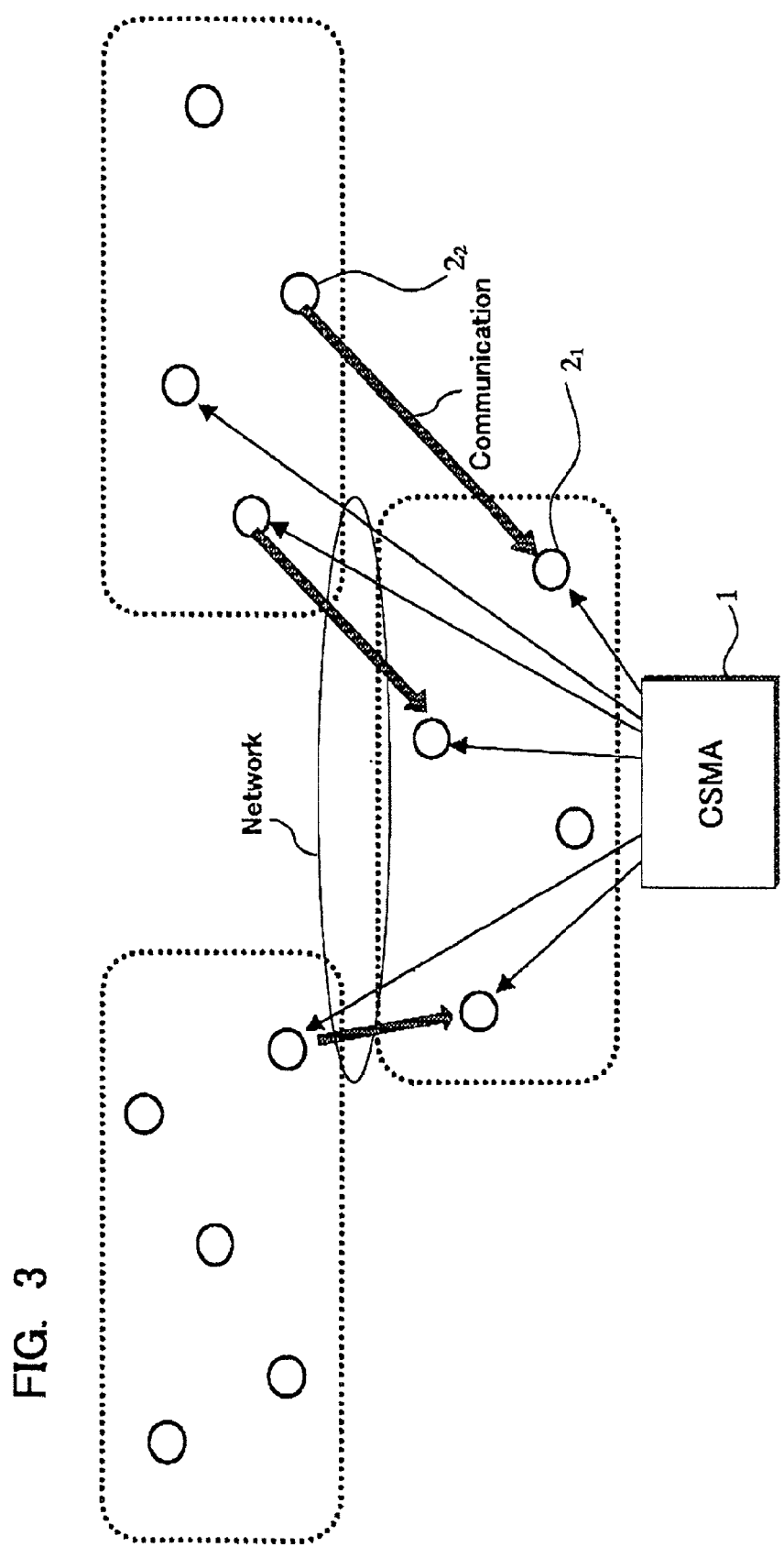
FIG. 3 is a block diagram for explaining a third prior art.

In the case of the above two samples, as shown in FIG. 3, if there exists only the one communication setting management apparatus 1, when both domains are different systems, respectively, the system not having the communication setting management apparatus 1 must request a mating system to change the policy, and this requires much labor and efficiency is worse.

Figure 6:
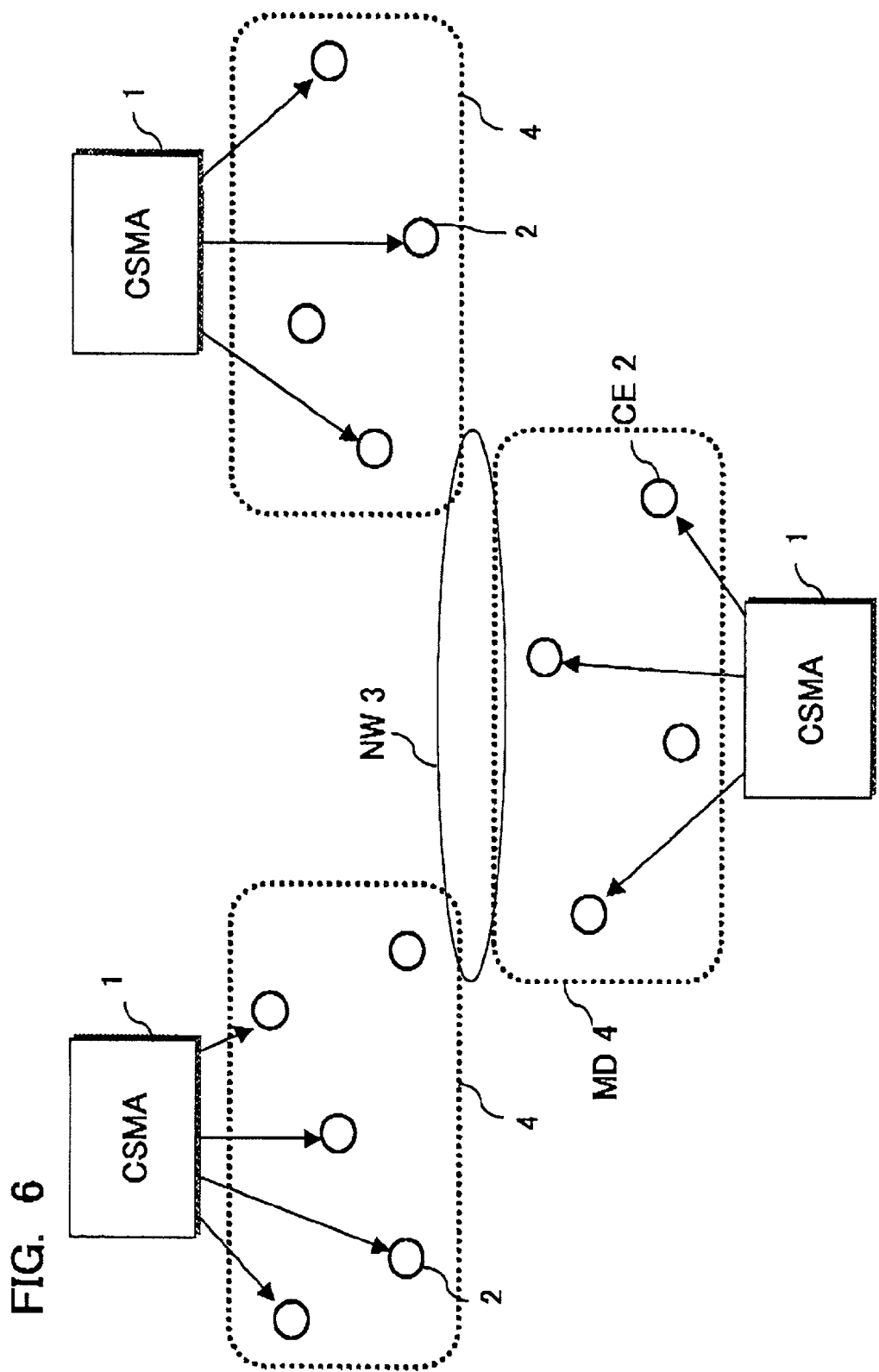
FIG. 6 is a block diagram for explaining a constitution according to a third embodiment of the present invention.

As a constitution according to the present invention for solving such the problems, FIG. 6 shows a placing method of the communication setting management apparatus (CSMA) 1.

In FIG. 6, the communication entity (CE) 2 is in a management domain (MD) 4, and a plurality of the management domains 4 are connected to each other via a network (NW) 3. One communication setting management apparatus 1 is placed in each managing domain 4, and the setting is fed into the communication entity 2 within the management domain 4 in response to each communication setting management apparatus 1.

Here, the management domain 4 may correspond to any region, and is generally partitioned in each system managing the communication entities 2. The communication entities 2 within the management domain 4 are connected to each other, and furthermore they are also connected to the network 3 coupling between the management domains 4 (not shown).

As described above, the communication setting management apparatus 1 is placed in each management domain 4, whereby a policy of communication (setting templates and application rules) which may be different across the communication, or is convenient in differing from each other can be described in each of the respective domains and managed. Thus, inefficiency occurs in the case where the communication setting management apparatus 1 is only one, and the inefficiency such as a change request to a mating system can be eliminated.

Here, in the constitution shown in FIG. 6, as the communication setting management apparatus 1 is placed in each of the managing domains, there are possibilities that the setting in which equalization is needed across the communication is described as different setting contents.

For example, if a policy (settings or application rules) in which different encryption algorithms are applied across a certain communication is input, the communication cannot be achieved due to difference in the encryption algorithms when the communication actually occurs.

Figure 7:
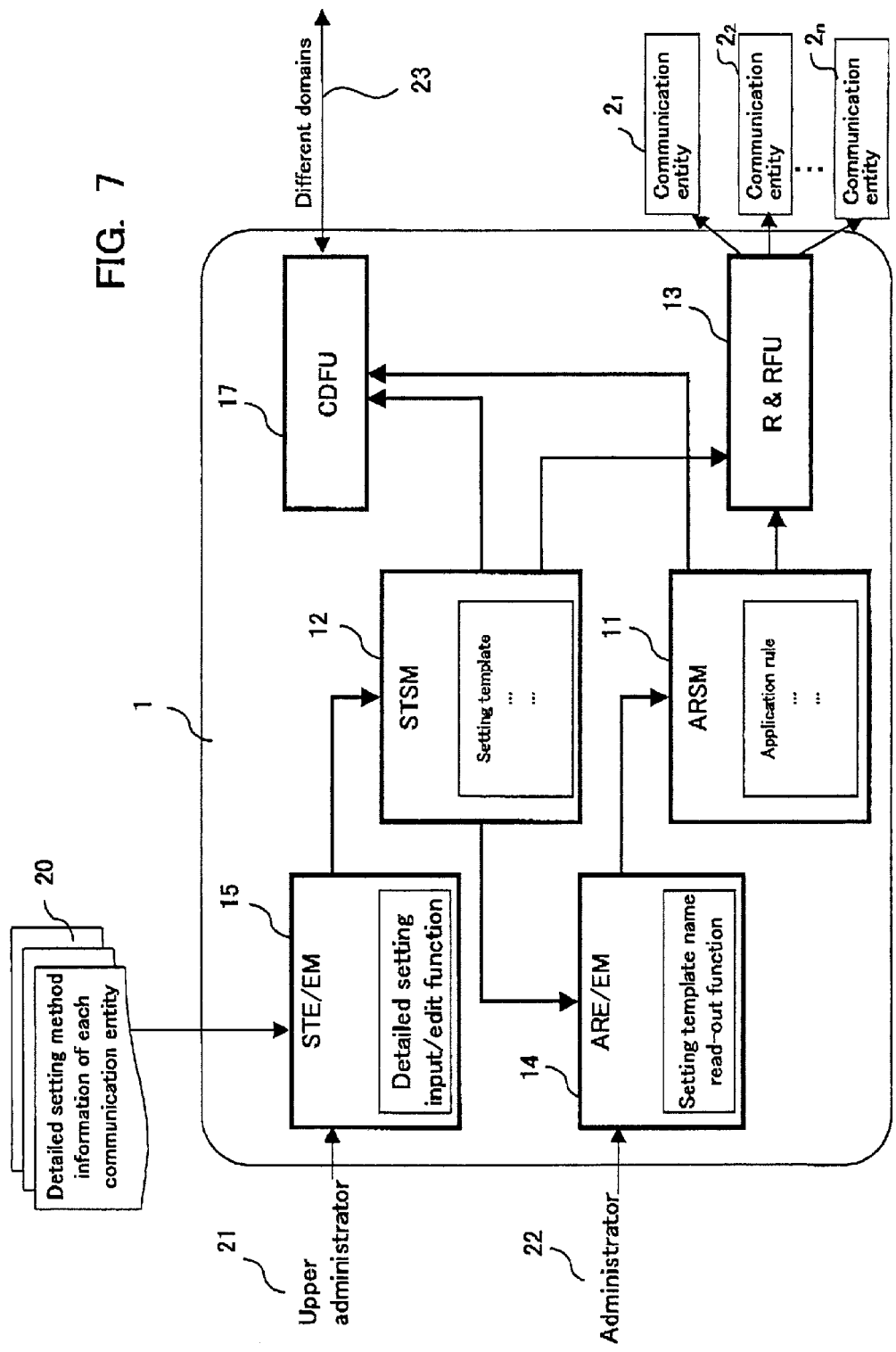
FIG. 7 is a block diagram for explaining a constitution according to a fourth embodiment of the present invention.

Accordingly, as a constitution of the embodiment for solving such problems, the conceptual structure is shown in FIG. 7. That is, in the case where the communication setting management apparatus 1 is placed in each domain 4 in the structure of FIG. 6, a constitution of the embodiment of FIG. 7 relates to the communication setting management system capable of settling, a contradiction in the setting or application rule occurred between the communication setting management apparatus 1 of different domains.

In the constitution of the embodiment of FIG. 7, a contradiction detection function unit (CDFU) 17 which mutually switches information relative to the communication setting management apparatus 1 of the different domains (23), and detects contradictions of the setting or application rules using the information is annexed to the communication setting management apparatus 1 in the constitution of the embodiment of FIG. 4. Thus, in the communication setting management apparatus 1, it is possible to solve the contradiction attributed to specification of the different setting templates which apply on the communication setting management apparatus 1 of the other domains.

That is, as the communication setting management apparatus 1 has the aforesaid contradiction detection function unit 17, it is possible to detect a contradiction of the policy (setting templates and application rules) relative to the communication setting management apparatus 1 of a communication-mating management domain. Thus, the contradicted setting templates are imparted to the communication entities, and as the result, it is possible to avoid problems that the communication entities fail a communication with the mate, etc.

Here, in a constitution of the embodiment of FIG. 7, a contradiction of the policy (settings or application rules) can be detected, but to modify the detected contradictions by re-entering, or editing the settings or application rules requires much labor and is inefficient.

As one of causes of contradictions, it is considered that the setting templates selected as the result caused in accordance with the application rule or gatherings of the setting templates are different. A conceptual diagram of the structure of the embodiment in view of such points is shown in FIG. 8.

Figure 8:
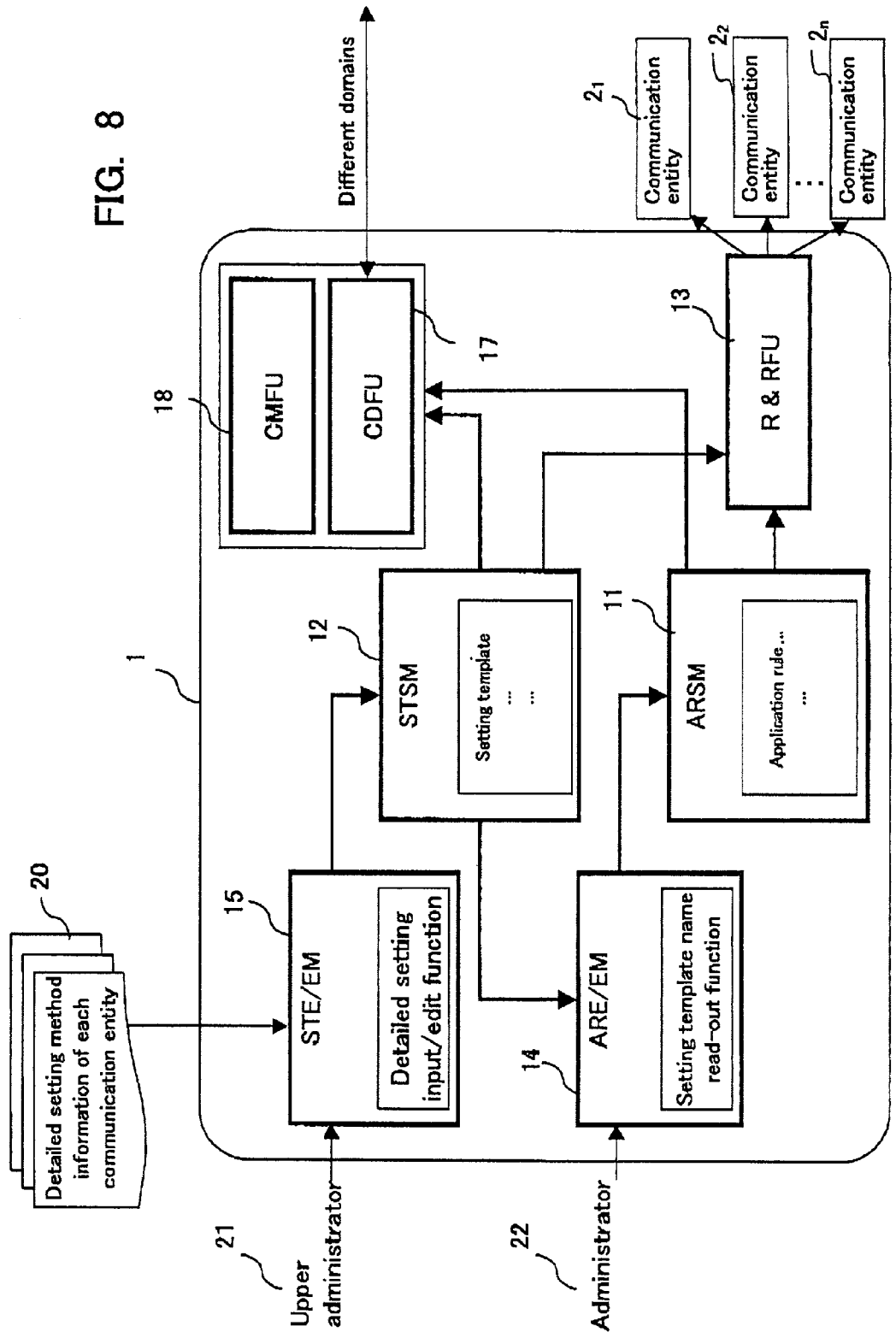
FIG. 8 is a block diagram for explaining a constitution according to a fifth embodiment of the present invention.

In a constitution of the embodiment of FIG. 8, the communication setting management apparatus 1 is further provided with the contradiction modification function unit (CMFU) 18. If a contradiction detection function unit 17 detects any contradiction, it requests the contradiction modification function unit 18 to modify.

In the case where the detected contradiction is attributed to a fact that the application rule specifies the different setting templates or gatherings of the setting templates, and moreover the difference can be modified by the given rules (not shown), the contradiction modification function unit 18 deems that this contradiction is to be modified.

It is not, in particular, prescribed in the present invention how the contradiction which is deemed to be modified should be handled, but, e.g. it is considered that the contradiction is accepted without deeming to be a contradiction as it can be modified, or the modified result is stored in the application rule storing means 14 as a new application rule.

As described above, in a constitution of the embodiment of FIG. 8, the contradiction modification function unit 18 makes the aforesaid action, whereby it is possible to deem that a contradiction can be modified, which is attributed to a fact that the setting templates specified by the application rule are different from those of the communication mate, or the gatherings of the setting templates are not completely coincident with each other, etc., and alternatively it is possible to actually modify the contradiction.

Thus, it becomes possible to automatically avoid and modify the contradictions attributed to the aforesaid causes without requiring modifications by hands of the administrators 21, 22.

Hereinafter, a concrete embodiment will be explained in the case where the communication setting management system on which the aforesaid embodiment notion is applied is used for management of security settings of communication.

Figure 9:
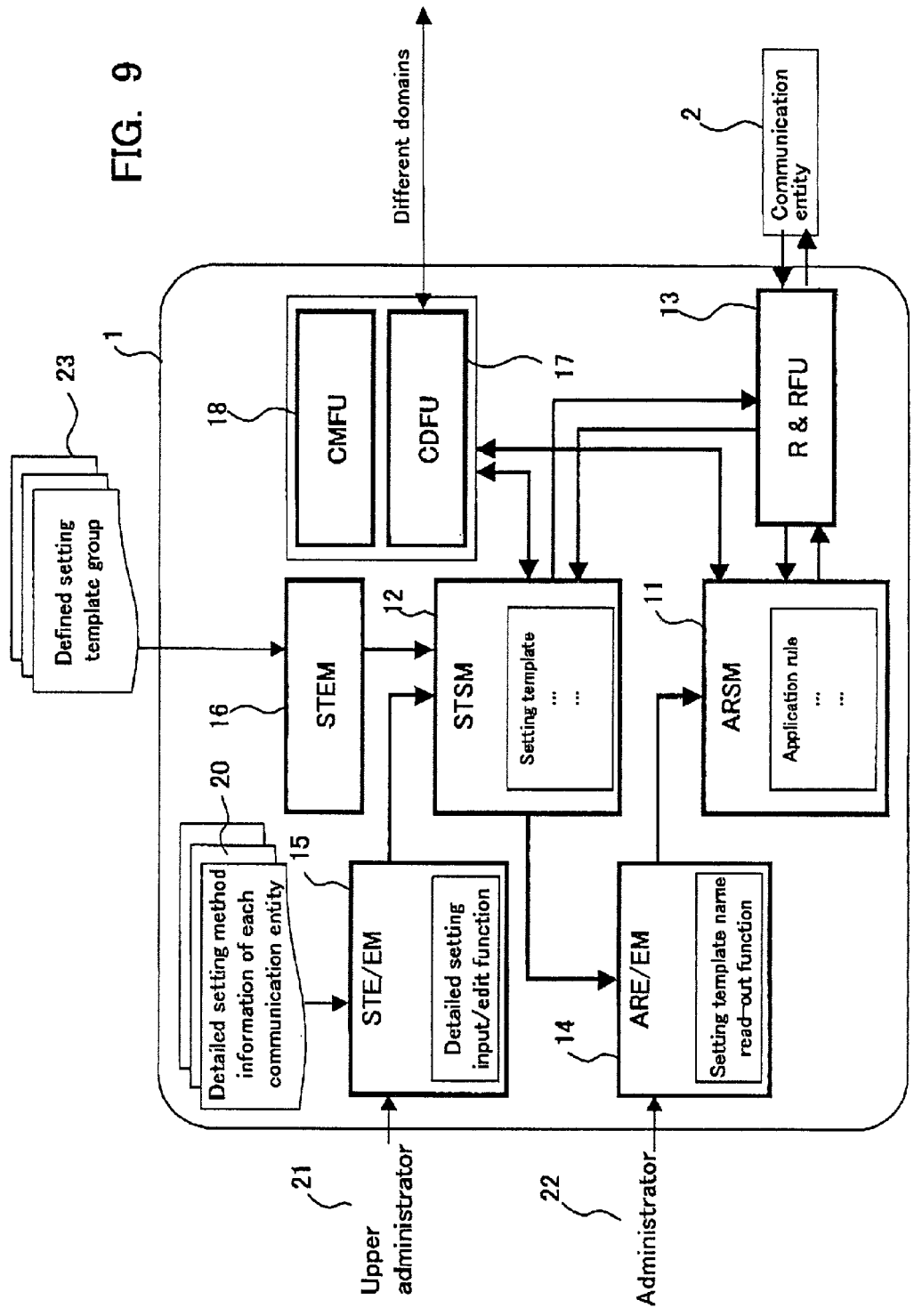
FIG. 9 is a block diagram of a concrete constitutional example of a communication setting management apparatus according to the first embodiment of the present invention.

FIG. 9 is a diagram showing a concrete embodiment in the case where the communication setting management system on which the aforesaid embodiment notion is integrally applied is used for management of security settings of communication, showing a constitutional example of the communication setting management apparatus 1 and the entire system provided therewith.

It is unnecessary that an information 20 in a concrete setting method of each communication entity is retained inside the communication setting management apparatus 1.

In this embodiment, it is retained inside the communication setting management apparatus 1 like FIG. 9.

In this embodiment, an attribute for distinguishing respective communications from each other is supposed to comprise next three parameters. That is, a subject, an action, and an object.

Hereinafter, the subject is a user name, and the object is a type of server, and the action is a process for the server as the object, comprising a read and a write.

FIG. 10 is a constitutional example of the concrete setting method information 20 of the communication entity. This information 20 denotes a method of setting a security function having possibilities that the information is tabled and supported by the communication entity. If receiving a character string in the information table, the communication entity is supposed to apply a corresponding security function.

The security is divided into three fields of authentication 200, concealment 201, and log record (audit) 202 in this embodiment.

Furthermore, four types of optional limbs are shown in the authentication 200, i.e. settings by exploiting RSA algorithm with a key of 512 bits, a key of 1024 bits, and a key of 2048 bits, and no authentication.

Three optional limbs are shown in the concealment 201, i.e. a DES encryption, a Triple DES encryption, and no concealment. Furthermore, two optional limbs are shown in the log record 202, i.e. presence and absence, simply.

FIG. 11 is a constitutional example of the setting templates stored in the setting template storing means 12. The setting templates comprise a combination of a setting template name 210, and a concrete setting contents 211 acquired from the information 20 of the concrete setting method of the aforesaid communication entity. In the example shown in FIG. 11, a comment 212 is annexed thereto as auxiliary information.

FIG. 12 is a constitutional example of the application rules stored in the application rule storing means 11. Admin, Customer, and User specified as subject 220 are not an individual user name, but each group name to which the user belongs, denoting in sequence an administrator group, a customer group, and a generic user group.

The information of a user's membership for the group is stored in each management domain by a storing means (not shown), and the administrators 21, 22 or the communication setting management apparatus 1 can freely procure it.

Next, in a constitution of the embodiment of FIG. 9, operations for realizing the notion of the embodiment of FIG. 4 will be explained. A first sequence is an input of the setting templates.

FIG. 13 is a sample of a screen to be displayed when the upper level administrator 21 having the high-grade knowledge in the setting method (the security setting method in this example) inputs the setting templates by use of the setting template entry/edit means 15.

In FIG. 13, a new setting template which is called "T04" is being annexed thereto. Four optional limbs are denoted in a part of the authentication 200 of the setting contents 211. These optional limbs are obtained from the information 20 of the concrete setting method of the communication entities shown in FIG. 10.

The upper administrator 21 decides which authorizing method is proper with reference to the information 20 and inputs it. The thus-input setting template is stored in the setting template storing means 12 by the setting template entry/edit means 15.

A second sequence is an input of the application rules. FIG. 14 is an example of a screen to be displayed when the general administrator 22 not having the high-grade knowledge inputs the application rules by use of the application rule entry/edit means 14.

FIG. 14 describes the security setting when a human being (Ex#staff group) of related companies reads out from a design drawing server. Five setting template names (T00, T01, T02, T03, T04) read out from the setting template accumulation means 12 concerning the allotted setting templates and comments in response thereto are presented as optional limbs. These are obtained from contents of the setting template storing means 12 shown in FIG. 11, and after input as described above, the application rules are stored in the application rule storing means 11.

Figure 15:
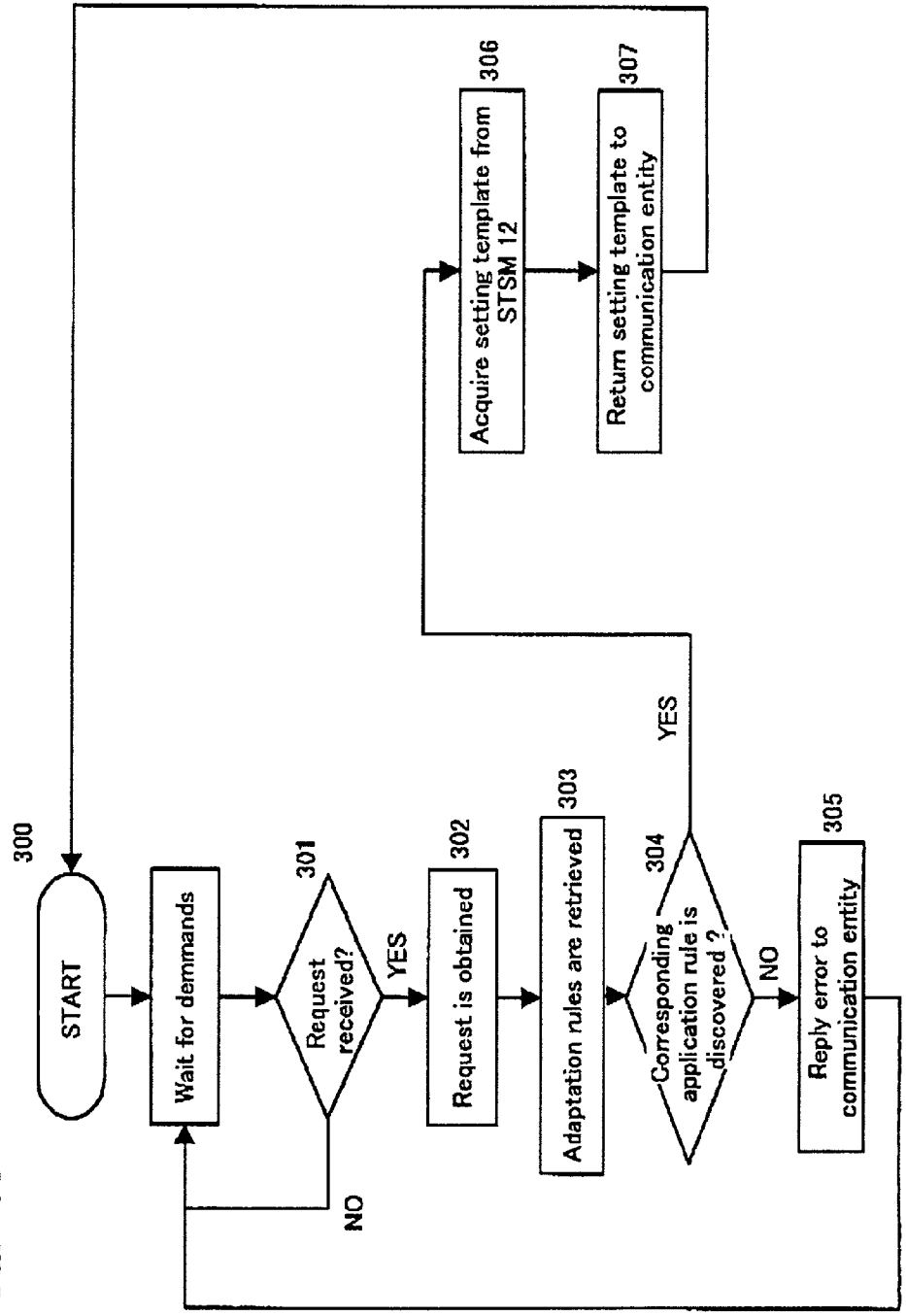
FIG. 15 is a flowchart for explaining an operation of a retrieval and response function unit according to the first embodiment of the present invention.

FIG. 15 is an operational flow in an embodiment in which the setting templates are distributed to the communication entities 2 based on the information prepared through the aforesaid two sequences. Normally, the retrieval and response function unit 13 waits for demands from the communication entities 2 (300).

When a communication starts with a command from a user, the communication entity 2 issues a request to the communication setting management apparatus 1 in order to be informed of what kind of setting should be applied on the communication. At this time, a user name of the subject 220 as an attribute of the communication, a server name of the object 222, and the desired operation 221 are in formed to the communication setting management apparatus 1. It is here supposed that they are "yamada", "personnel information server", and "read."

If the communication setting management apparatus 1 receives a request from the communication entity 2 (301-YES), the request is analyzed to obtain three items (220, 221, 222) of the aforesaid attribute (302).

Next, adaptation rules which conform to this attribute are retrieved from the application rule storing means 11 (303). At this time, as the group names are described in a column of the subject 220 of the application rules in this example, it is necessary to obtain the group names to which the user names belong from a storing means (not shown).

It is here supposed that the user "yamada" belongs to only the group "User." Then, since the application rules conforming to this attribute are ones in the sixth line in FIG. 12, it is understood that the setting template having a name "T02" should be applied thereon.

If here not discovering the corresponding application rule (304-NO), reply a fact of an error to the communication entity 2 and return to a request waiting state (305).

In the case where discovered like this example, the retrieval and response function unit 13 retrieves and acquires the setting template which is named "T02" from the setting template storing means 12 (306). This is returned to the communication entity 2 (307). Return to a request waiting state again.

The communication entity 2 sets communication characteristics in accordance with the received setting templates. That is, in this example, the authentication (200) is made by use of a key of 512 bits by the RSA algorithm from FIG. 11, and the contents of communication are encrypt (201) by the DES algorithm, and setting is executed so as to leave behind the record of communication in a log (202).

Incidentally, it is not, in particular, prescribed in the present invention how the communication entity 2 interprets and sets the setting templates.

Next, in a constitution of the embodiment of FIG. 9, operations of realizing the notion of the embodiment of FIG. 5 will be explained.

It is here supposed that the communication entity 2 capable of realizing a concealment by RC4 encryption algorithm is newly introduced into a certain system. At this time, a designer of such the communication entity 2 and the upper administrator 21 having the high-grade knowledge prepare setting template groups 23 shown in FIG. 16A, and instead of entering them, respectively, it is possible to readily annex them to the setting template storing means 12 by use of the setting template collectively entering means 16.

The setting template storing means 12 confirms whether or not each setting template included is contradictory to the information of allowable setting contents 211 shown in FIG. 16B with respect to the given previously defined setting template groups 23. With no problems, it is sequentially annexed to the setting template storing means 12. After all that are contradictory to the information of the setting contents 211 are once received, illegality is collectively notified to an input stuff.

Next, as a concrete embodiment 2, constitutional examples or operations in FIGS. 6 to 7 are denoted in the case where a different System is the management domain 4.

Figure 17:
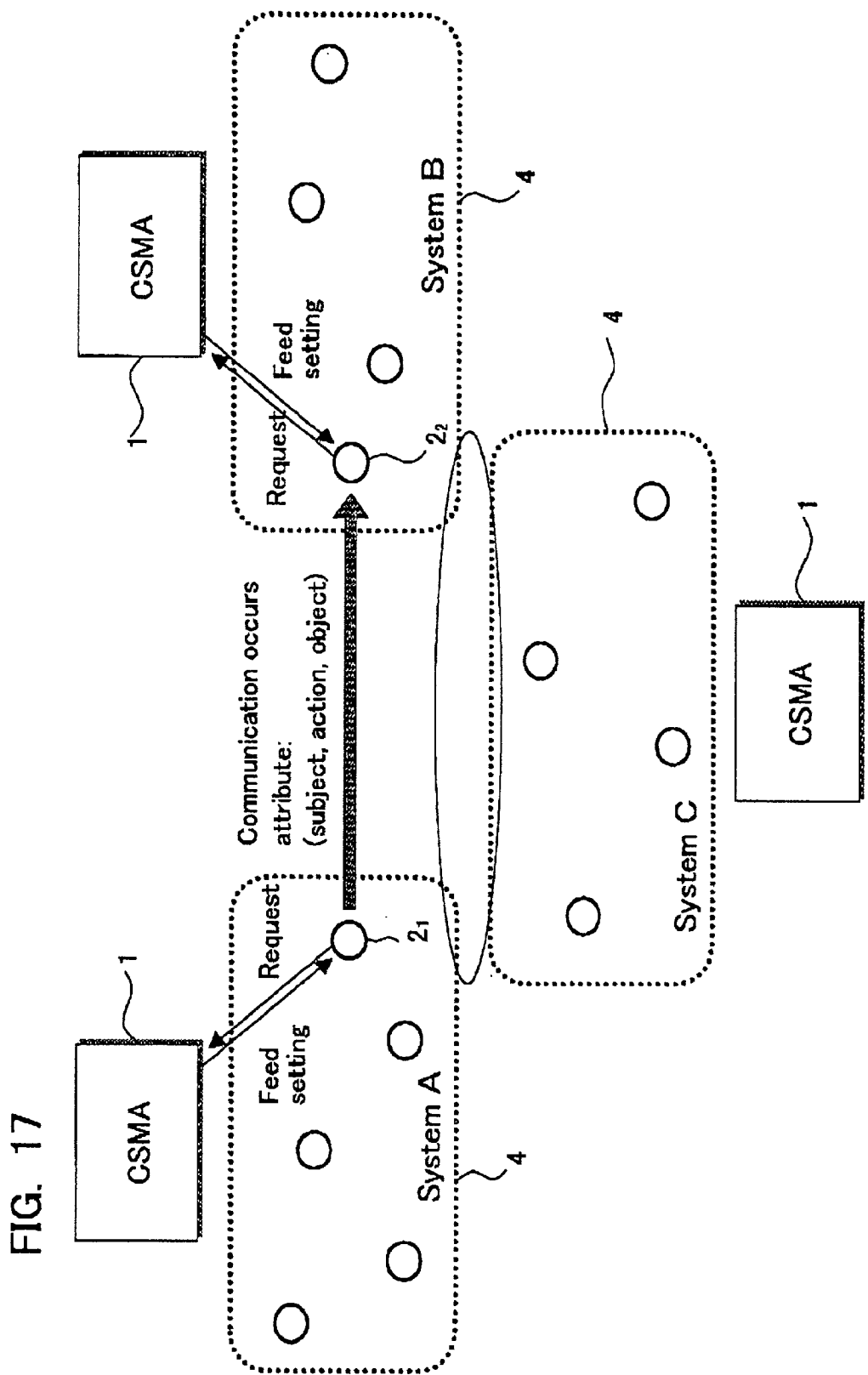
FIG. 17 shows a sample of a placement of the communication setting management apparatus according to a second embodiment of the present invention.

FIG. 17 is a concrete example of a method of placing the communication setting management apparatus 1 shown in FIG. 6. When a communication occurs across systems A, B, the communication setting management apparatus 1 of the management domain 4 to which the communication entities 21, 22 across the communication belong feeds each setting. The management domain 4 is divided in each of the systems A, B, and each one is supposed to be an enterprise.

The interior of each communication setting management apparatus 1 is the same as the embodiment described already, and is supposed to have a constitution of FIG. 9. Furthermore, the communication setting management apparatus 1 of the system A, B communize the setting template shown in FIG. 18, and are stored in the setting template accumulation means 12, respectively.

FIGS. 19A and 19B are application rules of the systems A, B, respectively. In the system B, the application rules shown already are supposed to be stored in the application rule storing means 11 of the communication setting management apparatus 1.

In this case, the case where the application rules 31, 32 shown in the drawing in the system A are input is considered. Incidentally, the lower a number of the application rules, the higher a priority order, i.e. a retrieval is rendered in descending order at the time of retrieval, and ones which conform thereto in the first place apply thereon.

As explained in FIG. 6, the placement of the communication setting management apparatus 1 in each management domain 4 is advantageous in that it is possible to input the different policy in each management domain 4.

For example, in the case where the application rules 31 are input, with respect to such a communication that the subject 220 is a User group, the object 222 is a general server, and the action 221 is a read, the different setting templates of T21 in the system A and T22 in the system B are allocated.

According to FIG. 18, however, the templates T21, T22 are different in presence or absence of the log record 202. The log record 202 may not be equal across the communication. Namely, since it does not matter that the log is recorded on the one hand, and the log is not recorded on the other hand, such the setting is valid.

Furthermore, in the case where the application rules 32 are input, the setting templates are allocated with a group name called user in the system A and a group name called section A in the system B, but in the system A, the users are managed with a division referred to as a generic user group User and an administrator group Admin. On the other hand, in the system B, if the uses are managed with a division referred to as department A: Section A and department B: Section B, it is easier that the application rules are described as Section A and Section B.

However, in the case where the User group is overlaid on the Section A group, i.e. in the case where there exist any user belonging to both the groups, the different setting templates with T23 in the system A and T24 in the system B are allotted. For this reason, there are possibilities that a contradiction occurs.

Concrete examples of FIGS. 6 to 8 which detect, avoid, or modify such contradictions will be explained below.

After the contradiction detection function unit 17 obtains contents of information to be transmitted to or received from the other management domain 4, as a concrete contradiction detection algorithm using the part 17 depends on attributes of communication, a describing method of the application rules, or the like, it is not in particular limited in the present invention.

Here, a simple contradiction detecting method is explained as a sample in which overlapping of groups is simply examined by use of the attributes information of the groups, and the contradictions or equivalent relations between the setting templates are imparted as separate information. Incidentally, as the other contradiction detecting methods, a describing method, etc. are enumerated in Japanese Patent Application Laid-Open Publication 6-6347 described above.

Figure 20:
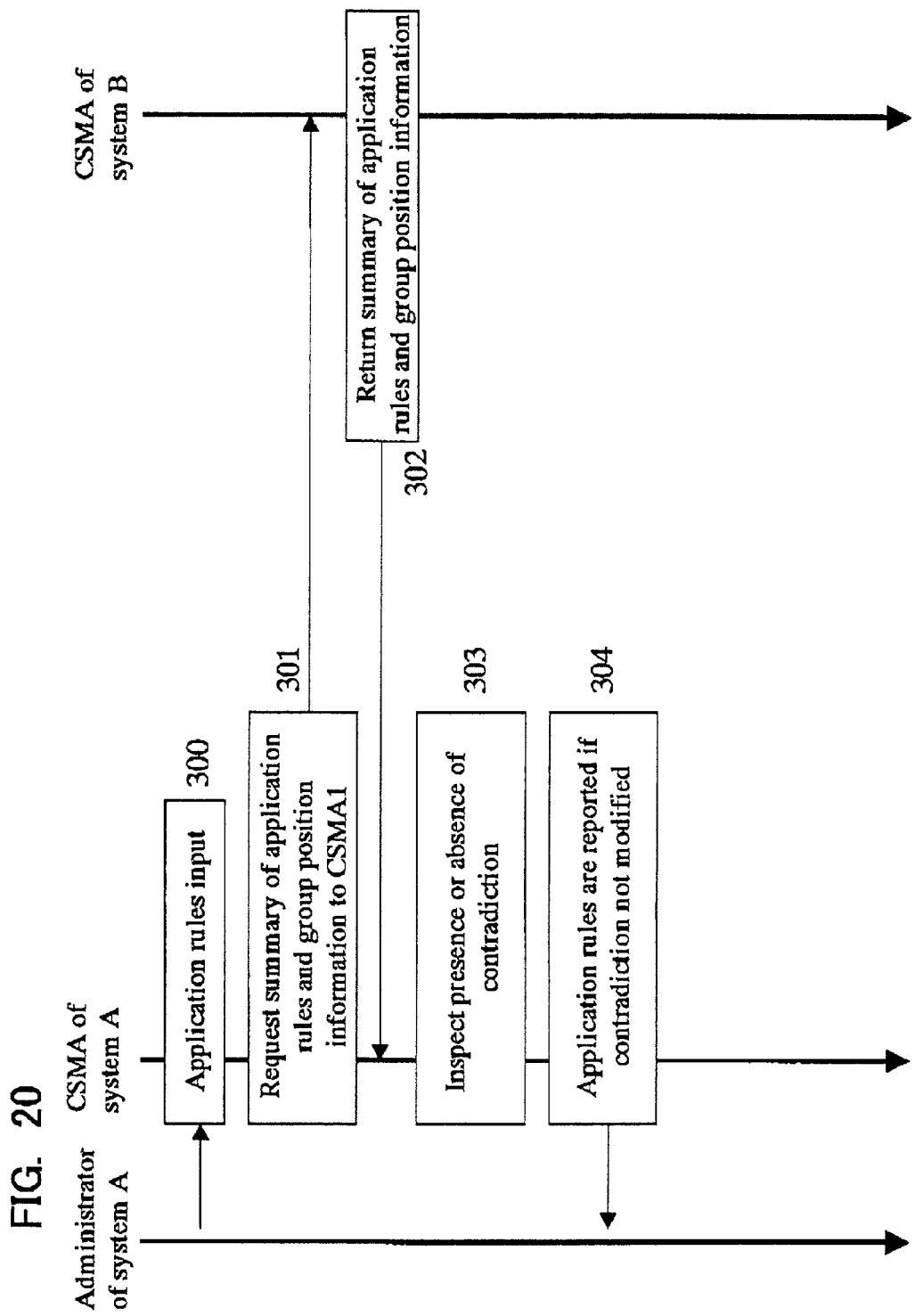
FIG. 20 is an illustration for explaining an operation of a contradiction detection function.

FIG. 20 is an illustration for explaining operations of a contradiction detection. If the application rules 31 are input (300), the contradiction detection function unit 17 of the communication setting management apparatus 1 of the system A requests a summary of the application rules and group position information to the communication setting management apparatus 1 of the system B (301).

The communication setting management apparatus 1 of the system B receives this request, and returns the summary of the application rules and the group position information in FIG. 18 (302). Next, the contradiction detection function unit 17 of the system A collates the input application rules with the application rules of the system B one by one in sequence, and the part 17 inspects whether or not there is overlapping in the attribute (a main body attribute in this case) by use of the group position information if necessary, while inspecting presence or absence of the contradiction (303).

Here, it is supposed to be first simply decided that, if the setting template names are different from each other, they are contradictory. If the application rules 31 are input, the contradiction detection function unit 17 collates the above with three application rules of the system B in sequence, and the initial collation with the application rules allows to recognize that the three attributes are completely coincident with each other irrespective of the difference in the allocated setting templates.

Then, they are here once deemed to be contradictory. Furthermore, if the application rules 32 are input, they are not contradictory to the initial application rules, but as the first allocated setting templates are different relative to the second application rules, it is recognized that there are possibilities of a contradiction, and next as the object and action which are two out of the three attributes are coincident with each other, there occurs a problem whether or not the remaining main body group has the overlapping.

Then, the part 17 collates the group position information of the system B with the group position information of the system A, and inspects whether or not the User group is overlaid on the Section A group. If overlaid, it is here once deemed to be contradictory.

If the contradiction is not modified, e.g. the application rules which are deemed to be contradictory are reported to the administrator, thereby urging a re-input (304).

Figure 21:
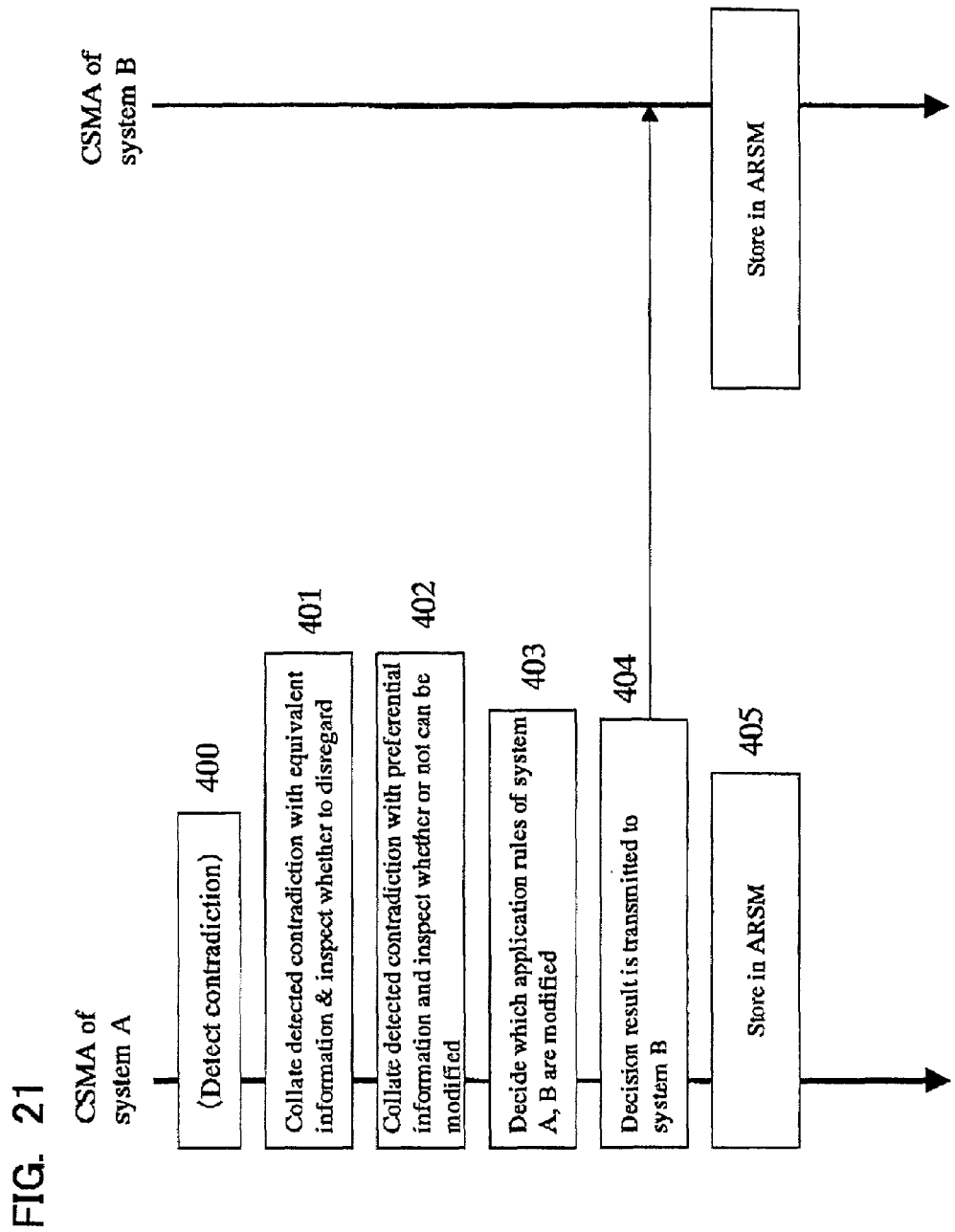
FIG. 21 is an equivalent information and a preferential information of the setting templates.

Next, a method of modifying the detected contradiction as described above will be described. FIG. 21 is an illustration for explaining an operational example of contradictory modification. In this operational example, the contradiction modification function unit 18 is supposed to have two pieces of information (not shown). They are an equivalent information and a preferential information of the setting templates. These examples are shown in FIG. 22.

At first, the contradiction modification function unit 18 detects a contradiction (400), collates the detected contradiction with the equivalent information, and inspects whether to disregard it (401). Even if setting template names are different across the communication, they do not matter. Therefore, the equivalent information denotes a combination of the setting templates which are deemed to be equivalent.

For example, in an input of the application rules 31, the differences of the setting templates of T21, T22 are detected as a contradiction, but as these differences relate to only presence or absence of the log record, it is described in the equivalent information that T21 and T22 are deemed to be equivalent (refer to FIG. 22A). Then, these differences are deemed not to be contradictory.

Next, the contradiction modification function unit 18 collates the detected contradiction with the preferential information (refer to FIG. 22B), and inspects whether or not it can be modified according to the priority order (402).

A combination of the setting templates in which the priority order exists between the setting templates different from the preferential information, and one setting template may be modified is denoted.

For example, in the input of the application rules 32, as described above, there occurs a contradiction that, in the overlapping between the User group and the Section A group, T23 is selected on the one hand and T24 is selected on the other hand.

However, the differences between T23 and T24 are one in encryption algorithms, and if a selection of a stronger encryption algorithm is brought to an end, as the Triple DES (T24) is stronger than the DES (T23), T23 is modified into T24, thereby avoiding a contradiction.

In the case where the contradiction is modified, a change of the application rules must be transmitted to the system B, and at this time, it is decided which application rules out of the systems A, B are modified (403). In the above example (FIG. 22B), as T23 to be modified is allocated in the system 23, in an overlapping part 500 of the groups (refer to FIG. 23 denoting the relation of the groups), the application rules 32 of the system A should be modified.

However, since the allocation of T23 of the system A is valid in an non-overlapping part, the overlapping part becomes a modification result, and a number of a position of inserting the application rules is decided so as not to exert influences on the other parts (refer to FIG. 23).

In the case of this sample, it is necessary that the application rules of the system B are annexed prior to a number 2 in the system A, and the application rules of the system A are annexed behind the number 2 in the system B (406). This decision result is transmitted to the contradiction modification function unit of the communication setting management apparatus of the system B (404), and the application rules are annexed to the application rule accumulation means in its own part as described above (405).

Thus, the application rule storing means 11 of the systems A, B are illustrated as in FIG. 24. Incidentally, in the aforesaid embodiment 2, a method of examining presence or absence of overlapping in members of all the groups is used by use of the group position information, but if the groups are defined so as not to overlap each other, or another method of knowing presence or absence of the overlapping is prepared, a detection of overlapping may be rendered by use thereof.

Furthermore, the overlapping is inspected in only the groups of the user as a main body in the above examples, but as mentioned in "Conflict Analysis for Management Policies" Fifth IFIP/IEEE by E. Lupu and M. Sloman, it is possible to similarly inspect the other attributes.

Furthermore, it is deemed that the equivalent information and priority information of the setting templates have separately been prepared and the contradiction modification is rendered, but a means or necessary information for disregarding contradictions or modifying to a new setting template is not limited thereto.

According to the present invention, in the communication setting management apparatus which distributes communication settings to a plurality of the communication entities, it is possible to simultaneously realize a description of finest communication settings requiring the high-grade knowledge and a description of the easy application rules not requiring the high-grade knowledge, and to use properly the both by the administrator's knowledge.

Furthermore, the communication setting management apparatus is placed in each management domain, where by the management when realizing different settings in each management domain is made efficient. Furthermore, at that time, it becomes possible to automatically detect a contradiction of the policy (settings and application rules) occurred relative to the mating management domain, or to automatically modify, not manually.

What is claimed is:

1. A communication selling management system for distributing communication characteristics settings to a plurality of communication entities connected to a network, the communication setting management system comprising a plurality of communication management setting apparatuses for managing a plurality of respective management domains, the system comprising:

a setting template entry/edit unit operated by a first administrator to enter or edit a setting template that collects contents to be set for the plurality of communication entities connected to the network, with reference to information on a concrete method of setting the communication entities;

a setting template storing unit storing each setting template entered or edited by the setting template entry/edit unit as operated by the first administrator;

an application rule entry/edit unit operated by a second administrator to enter or edit application rules prescribing rules corresponding to the setting template, entered or edited in the setting template entry/edit unit operated by the first administrator, which is to be applied to a communication having a specific attribute;

an application rule storing unit storing each application rule entered or edited by the application rule entry/edit unit;

retrieval and response function unit selecting, after the entering or editing the application rules by the second administrator, an application rule from the application rule storing unit in accordance with an attribute of a corresponding destination communication entity, reading from the setting template storing unit a setting template having a setting template name specified by the selected application rule, and distributing the read setting template to the corresponding destination communication entity; and a contradiction detection function unit belonging to one of the management domains that mutually interchanges information between communication setting management apparatuses disposed in different management domains and detects a contradiction between the mutually interchanged information and the setting template and the application rule of the domain of the contradiction detection unit, wherein the management domains communicate via a network, each management domain having at least one communication entity and a communication setting management apparatus that imparts, on a management domain basis, different communication characteristics settings to respective communications between communication entities belonging to different management domains, each communication characteristics setting being managed on a corresponding management domain basis.

2. The communication setting management system according to claim 1, further comprising:

setting template collective entering unit collectively entering a group of previously defined setting templates into the setting template storing unit.

3. The communication setting management system according to claim 1, further comprising:

a contradiction modification function unit modifying a contradiction, at the time when the contradiction is detected, that a setting template or setting templates specified by the contradiction detection function unit according to the application rule to be the same, instead, are not.

4. A communication setting management method for distributing communication characteristics settings to a plurality of communication entities connected to a network, the communication entities each belonging to one of a plurality of management domains, each management domain being managed by a communication management setting apparatus, the method comprising:

entering or editing, by a first administrator, a setting template that collects contents to be set for the plurality of communication entities connected to the network, with reference to information on a concrete method of setting the communication entities;

storing each setting template entered or edited by the entering or editing as operated by the first administrator;

entering or editing, by a second administrator, application rules prescribing rules corresponding to the setting template, which is to be applied to a communication having a specific attribute;

storing each application rule entered or edited by the entering or editing;

selecting, after the entering or editing the application rules by the second administrator, an application rule from the storing each application rule in accordance with an attribute of a corresponding destination communication entity, reading from the storing each setting template a setting template having a setting template name specified by the selected application rule, and distributing the read setting template to the corresponding destination communication entity;

mutually interchanging information between communication setting management apparatuses disposed in different management domains; and detecting a contradiction, via a contradiction detection unit belonging to one of the management domains, between the mutually interchanged information and the setting template and the application rule of the management domain of the contradiction detection unit, wherein the management domains communicate via a network, each management domain having at least one communication entity and a communication setting management apparatus that imparts, on a management domain basis, different communication characteristics settings to respective communications between communication entities belonging to different management domains, each communication characteristics setting being managed on a corresponding management domain basis.

5. The communication management setting method of claim 4, further comprising:

imparting contradicted setting templates to the communication entities, thereby avoiding problems where communication between the entities fails.

* * * * *

UNITED STATES PATENT AND TRADEMARK OFFICE
CERTIFICATE OF CORRECTION

PATENT NO. : 7,353,263 B2  Page 1 of 1
APPLICATION NO. : 09/853782
DATED : April 1, 2008
INVENTOR(S) : Ikuya Morikawa et al.

It is certified that error appears in the above-identified patent and that said Letters Patent is hereby corrected as shown below:

On the Title Page, Item (73), Line 3, change "Informationstecknik" to --Informationstechnik--.

Column 14, Line 46, change "selling" to --setting--.

Signed and Sealed this

Nineteenth Day of August, 2008

JON W. DUDAS
*Director of the United States Patent and Trademark Office*